United States Patent

[11] 3,579,144

[72] Inventor Michael Rotolo, Jr.
Cherry Hill, N.J.
[21] Appl. No. 808,587
[22] Filed Mar. 19, 1969
[45] Patented May 18, 1971
[73] Assignee RCA Corporation

[54] RELAXATION OSCILLATOR SATED BY TRANSISTOR SWITCH
7 Claims, 2 Drawing Figs.

[52] U.S. Cl. .... 331/111, 331/143, 331/173
[51] Int. Cl. .... H03k 3/26
[50] Field of Search .... 331/111, 173, 143

[56] References Cited
UNITED STATES PATENTS
3,395,334 7/1968 Stein .... 331/111X
3,445,683 5/1969 Traina .... 331/111X

*Primary Examiner*—Roy Lake
*Assistant Examiner*—Siegfried H. Grimm
*Attorney*—H. Christoffersen

ABSTRACT: A unijunction transistor, a switch such as the emitter-to-collector path of a bipolar transistor, connected with the emitter-to-base path of the unijunction transistor, and a charged capacitor connected across the series circuit. When the switch is closed, the capacitor instantaneously discharges through the emitter-to-base diode of the unijunction transistor. Thus, the leading edge of this discharge wave is substantially coincident in time with the closing of the switch, that is, with the turn-on pulse employed to drive the bipolar transistor into conduction.

INVENTOR
MICHAEL ROTOLO
BY H. Christofferson
ATTORNEY

RELAXATION OSCILLATOR SATED BY TRANSISTOR SWITCH

BACKGROUND OF THE INVENTION

There is a class of gated relaxation pulse generators, known in the art, which include a timing capacitor, a charging circuit for the capacitor and a discharging circuit which may include a transistor. The charging circuit is usually driven by a gated transistor or other switching device that holds the capacitor at a reference potential, normally ground potential, prior to the application of the gating signal to the gated transistor. The application of the gating signal permits the timing capacitor to charge to the turn-on potential of the transistor in the discharge circuit. In this type of circuit there is intrinsically a delay, equal to the charge time of the capacitor, between the leading edge of the gating signal and the leading edge of the first output pulse.

The object of this invention is to provide a pulse generator of the general type discussed above but which produces an output pulse whose leading edge is substantially time coincident with the leading edge of the gating pulse. That is to say, there is essentially no delay between input and output.

BRIEF SUMMARY OF THE INVENTION

A device of the type which in response to a voltage of greater than a given magnitude applied across two of its electrodes exhibits a relatively low impedance between these electrodes and in response to a value of voltage lower than a second value exhibits a relatively high impedance. Charge storage means and switch means are connected in series across the two electrodes. Means are connected across the charge storage means to charge the storage means at a rate such that when the switch opens, the voltage developed across the charge storage means exceeds the given magnitude, whereby, when the switch means is closed, the charge storage means instantaneously discharges until the voltage thereacross reduces to a value lower than said second value.

DETAILED DESCRIPTION

Figure 1:
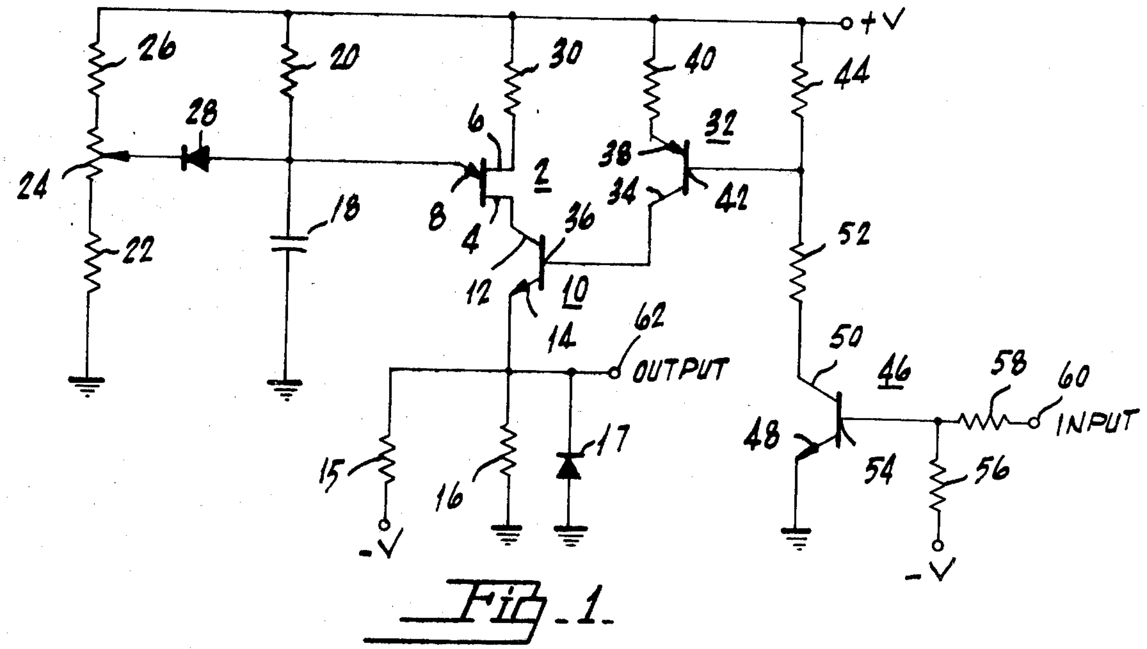
FIG. 1 is a schematic drawing of a preferred form of the present invention.

The circuit of FIG. 1 includes a unijunction transistor 2 having two base electrodes 4 and 6 and an emitter electrode 8. A switch, which may be a bipolar transistor such as shown at 10, is connected at its collector electrode 12 to base 4 and at its emitter electrode 14 through load resistor 16 to a source of reference potential such as ground. Output terminal 62 is connected to the common junction of resistor 16 and emitter 14 of transistor 10. The emitter electrode 14 is also connected through resistor 15 to a source of forward voltage such as −V. A diode 17 is connected at its cathode to emitter 14 and at its anode to ground. The transistor shown is of NPN type. However, it is understood that with minor circuit redesign, a transistor of opposite conductivity type may be employed instead.

A charge storage means such as capacitor 18 is connected between the emitter electrode 8 of the unijunction transistor and ground. The capacitor is continuously charged by a voltage source +V which supplies charging current to the capacitor through resistor 20. The level to which the capacitor may charge is determined by the voltage divider 22, 24, 26 to which one terminal of the capacitor is connected by means of diode 28. The same voltage source supplies operating voltage to the unijunction transistor through resistor 30.

A constant current source, shown as a transistor 32, is connected at its collector 34 to the base electrode 36 of the transistor 10. The emitter electrode 38 of this transistor is connected through resistor 40 to the source of potential +V. The base electrode 42 of transistor 32 is connected through resistor 44 to the source of potential +V.

A gating device, shown as transistor 46, has its emitter electrode 48 connected to a reference potential such as ground. The collector electrode 50 of this transistor is connected through resistor 52 to the base electrode 42 of transistor 32 and to resistor 44. The base electrode 54 of transistor 46 is connected through resistor 56 to a source of reference potential such as −V and through resistor 58 to input terminal 60.

For purposes of illustration, the capacitor 18 is assumed initially to be uncharged, and it is also assumed that there is no gating signal from a source (not shown) applied to the input terminal 60. The capacitor 18, therefore, begins to charge towards the potential +V through the resistor 20. At a potential $+V_p$, which is lower than +V, the diode 28 begins to conduct and the voltage across the capacitor 18 is clamped to $+V_p$. The variable resistor 24 is adjusted so that the voltage at which the diode 28 begins to conduct is slightly higher than the firing potential of the unijunction transistor 2.

There are other means for clamping the voltage across the capacitor 18 to a predetermined level. For example, the voltage divider network 22, 24, 26 and diode 28 may be removed from the circuit and a Zener diode having a breakdown potential slightly higher than the firing potential of the unijunction transistor may be connected across the capacitor 18. In such a case, the Zener diode conducts when the capacitor is charged to the voltage $+V_p$, and the voltage across the capacitor, therefore, is clamped to this potential.

In the absence of the gating signal at the input terminal, the unijunction transistor 2 cannot conduct due to the very high impedance of the nonconducting transistor 10 coupled to its base electrode 4. Transistor 10 is nonconducting because its base electrode 36 is not being supplied current by the nonconducting transistor 32. Transistor 32 is nonconducting because its emitter 38 and base 42 electrodes are at the same potential due to the absence of current flow through the resistor 44. There is no current flow through the resistor 44 and resistor 52 because transistor 46 is reverse biased due to the potential −V coupled through resistor 56 to its base electrode 54.

Figure 2:
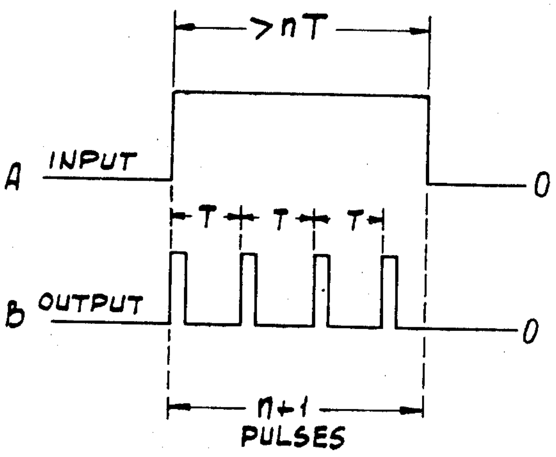
FIG. 2 shows certain waveforms applicable to the circuit of FIG. 1.

A positive-going gating signal, such as that illustrated at A in FIG. 2, may be applied to input terminal 60 to drive the transistor 46 into conduction. This causes current to flow from the source +V through resistors 44 and 52 and consequently the potential at the base electrode 42 of transistor 32 drops sufficiently to drive transistor 32 into conduction. Transistor 32 operates as a constant current source and draws sufficient current through resistor 40 and its emitter 38-to-collector 34 path instantaneously to drive the switch transistor 10 into saturation.

As was stated before, capacitor 18 is initially charged to a voltage level slightly higher than the firing potential of the unijunction transistor 2. Therefore, when the transistor 10 is driven into conduction, capacitor 18 discharges through the emitter 8-to-base 4 path of transistor 2 and the collector 12-to-emitter 14 path of transistor 10. The discharge current also flows through load resistor 16 to form an output pulse at terminal 62.

The leading edge of the first output pulse is substantially in time coincidence with the leading edge of the gating signal since the constant current source 32 instantaneously drives transistor 10 into saturation allowing the charged capacitor 18 instantaneously to discharge. The pulse generation section continues to generate output pulses, as illustrated at B in FIG. 2, as long as the gating signal remains high. In the drawing, these output pulses are idealized as, in practice, the trailing edges of the pulses are not as steep as shown.

The combination of resistor 15 and diode 17 clamps the output terminal 62 to approximately ground potential during the periods between output pulses. Resistor 15 is much larger than the resistor 16 and, therefore, has little effect during the time a pulse is being formed. Essentially all of the discharge current flows through resistor 16 at this time.

The values of capacitor 18 and resistor 20 determine the period T of the output pulses generated. The values of capacitor 18 and resistor 16 principally determine the discharge time and pulse width.

If the duration of the gating signal is slightly greater than $nT$, as shown at A in FIG. 2, there are $n+1$ pulses generated having period T, as illustrated at B in FIG. 2. For example, if the resistor 30 is 4,700 ohms, capacitor 18 is 0.22 microfarads and resistor 16 is 51 ohms, the period T is approximately 1 millisecond and the discharge time is approximately 11 microseconds. Therefore, if the gating signal has a pulse duration slightly greater than 3 milliseconds, $n$ has a value of three inasmuch as T is defined to be 1 millisecond. Thus, in the example, there are $n+1$ or 4 output n+generated, as illustrated at B in FIG. 2. This operation is provided inasmuch as the leading edge of the first output pulse is generated substantially concurrently with the leading edge of the gating signal. Additional output signals are produced in the normal operation. Consequently, if the gating pulse is greater than $n$ T, $n+1$ output pulses will be generated. It is to be appreciated that these values are merely illustrative and other component sizes may be utilized in the practice of this invention.

I claim:

1. In combination:
a device of the type which fires in response to a voltage of greater than a given magnitude applied across two of its electrodes and extinguishes when said voltage reduces to lower than a second value;
charge storage means connected at one terminal thereof to one of said electrodes of said device;
means connected across said charge storage means for charging the same at a rate such that, when said device is extinguished, the voltage developed across said charge storage means exceeds said given magnitude;
switch means connected between the other terminal of said charge storage means and the other electrode of said device so that said device instantaneously fires when said switch means is closed;
and constant current means connected to said switch means to selectively cause operation thereof.

2. A pulse generator comprising, in combination:
a unijunction transistor having two base electrodes and an emitter electrode;
a capacitor connected between said emitter electrode and a point of reference potential;
two terminals for a power supply, one of said terminals connected to supply operating potential to one base electrode of said unijunction transistor and connected also to said emitter electrode for charging said capacitor to a value such that the voltage across it exceeds the firing potential of said transistor, and the other terminal connected to said point of reference potential;
a second transistor having a base and an emitter-to-collector path, said path being connected in the forward direction between the other base electrode of said unijunction transistor and said point of reference potential;
means for applying to said second transistor base a signal for causing said transistor to conduct or to be cutoff;
the last-named said means including a constant current source; and
means for applying to said constant current source a signal to turn it on or off, such that when said source is turned on it supplies sufficient current to instantaneously drive said second transistor into saturation.

3. The combination as claimed in claim 2, said last-named means including means for applying a signal of duration>$n$T to said constant current source to turn it on and means for generating $n+1$ output pulses of period T in response to said signal.

4. A pulse generator comprising, in combination:
a unijunction transistor having two base electrodes and an emitter electrode;
a two terminal power supply;
a two terminal impedance element having one terminal connected to one terminal of said power supply and the other terminal connected to one base electrode of said unijunction transistor;
charge storage means coupled to said emitter electrode;
means connected across said charge storage means to charge it to a value such that the voltage across it exceeds the firing potential of said unijunction transistor;
a second transistor having a base, collector, and emitter electrodes;
means for connecting the collector electrode of said second transistor to the other base electrode of said unijunction transistor;
pulse forming means;
means for coupling said pulse forming means to the emitter electrode of said second transistor; and
means for selectively rendering said second transistor conductive or nonconductive such that when said second transistor is nonconductive, it is a high impedance to said unijunction transistor such that said charge storage means is unable to fire said unijunction transistor and when said second transistor is conductive, said charge storage means instantaneously fires said unijunction transistor and an output pulse is instantaneously formed across said pulse forming means.

5. The combination claimed in claim 4:
said last-named means comprising a constant current source;
means for applying a signal of duration >$n$T to said constant current source to turn it on; and
means for generating $n+1$ output pulses of period T in response to said signal.

6. In combination,
input means,
output means,
bistable means,
energy storage means for continuously storing energy therein,
said energy storage means connected to said bistable means to selectively supply energy thereto,
switch means connected between said bistable means and said output means such that said bistable means is connected in circuit and enabled to receive and operate on energy from said energy storage means when said switch means is activated, and
circuit means connected between said input means and said switch means such that said switch means is selectively activated by said input means,
said circuit means including current source means which selectively supplies current to said switch means in accordance with the condition of said input means.

7. The combination recited in claim 6 including control means connected to said energy storage means such that said energy storage means stores energy greater than the switching threshold level for said bistable means when said switch means is deactivated.